Figure 1:
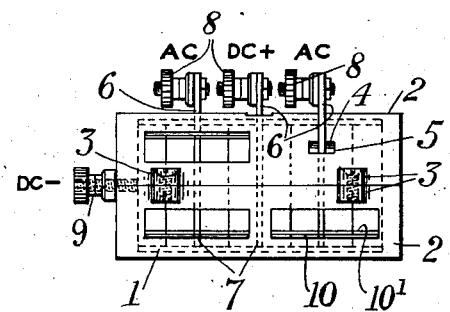

Jan. 1, 1935.   R. J. ELSOME-JONES   1,986,581
RECTIFIER FOR ALTERNATING ELECTRIC CURRENT
Filed Aug. 12, 1931

Inventor
R. J. Elsome-Jones
by
Atty.

Patented Jan. 1, 1935

1,986,581

UNITED STATES PATENT OFFICE 1,986,581

RECTIFIER FOR ALTERNATING ELECTRIC CURRENT

Ronald Job Elsome-Jones, Golders Green, London, England, assignor to International Standard Electric Corporation, New York, N. Y., a corporation of Delaware Application August 12, 1931, Serial No. 556,658
In Great Britain August 12, 1930

8 Claims. (Cl. 175—366)

This invention relates to static contact dry rectifiers for alternating electric currents using solid couples with asymmetric conducting properties i. e., unidirectional conducting properties or conducting properties more pronounced in one direction than in another.

The chief features of the invention consist in the incorporation of a barium compound on one electrode of each couple; in the provision of a rectifier in which both electrodes of each couple make oxide-to-oxide contact; and in the provision of an electrode alloy of aluminium, manganese, and magnesium that incorporates a barium compound.

In carrying out the invention I alloy the aluminium manganese and magnesium preferably in the percentages of 12, ½, and 87½ respectively, and turn, stamp, or otherwise form the said alloy into discs or other bodies of suitable shape. The proportions of the above elements may vary between ½% to 20% aluminium and 20% to ½% manganese, or in any other proportions provided the resulting alloy is satisfactorily workable.

The discs or the like are immersed in an electrolytic bath consisting of a barium salt in solution so as each to have a film of barium deposited on one face. The bath may consist of a 10% solution of chemically pure barium sulphide, slightly acidified, and the electrolyzing direct electric current may be four amperes at 50 volts. It will be understood that the barium is automatically converted into a complex compound when applied to the alloy.

The faces so coated with barium have applied to them, under a pressure of say ten tons per square inch, a paste primarily consisting of sulphur, selenium, manganese sulphide and antimony sulphide, preferably in the proportions of 1:1:1:½, respectively, by weight, and to the back of the paste is sealed a plate of brass, lead, lead alloy, or other suitable metal. Variations from the proportions of the materials in the paste will give a workable electrode and I may include in the said paste small quantities of cuprous, lead, or mercurous iodide, zinc sulphide, and lead sulphide.

The paste is made by grinding and mixing the constituents and then mixing the resulting powder with a selenious-phosphoric acid solution of say 6% strength, i. e. 6% solution selenious acid and 6% solution phosphoric acid: with the weights of the four main constituents in drams the solution is preferably 80 c. c. by volume. The solution containing the powder is boiled to dryness, reground, and compressed into a solid layer directly on to the barium-coated surface, preferably after a small quantity of a metallic sulphide such as ferric sulphide or other suitable compound or element has been added to the reground mixture in order to prevent the compressed layer becoming undesirably brittle. The compressed layer should not exceed $\frac{1}{32}$ of an inch in thickness for best results.

A rectifier or rectifiers consisting of one or more couples as above set out may be suitably assembled and inserted in an alternating current circuit with the outer faces of the couples joined by the brass or like plates above mentioned.

The couples may be, however, worked in circuit for a short period and the electrodes separated and then replaced in close contact but not necessarily under high pressure, and when the couples are connected in circuit again the complex oxides apparently formed on each electrode due to the passage of the initial current assist or perform rectification. Such an arrangement differs from previous proposals in that due to the low resistances of the electrodes, and oxides according to the invention, high pressure contact is not necessary and rectification takes place between or in conjunction with the oxides on the immediately adjacent faces of the electrodes, previous proposals, to the best of my knowledge, having made use of oxide-to-metal contact.

The couples may be assembled in any suitable manner, and in the accompanying drawing have been shown, by way of example, two satisfactory assemblies.

Fig. 1 being a side view of a full wave rectifier of tubular form; and

Figure 2:
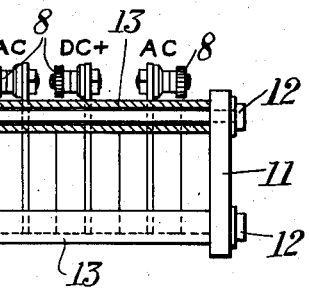

Fig. 2 a side view of a full wave rectifier of cage form.

In Fig. 1 the couples are enclosed in an insulating tube 1 arranged within a metal tube that consists of two similar halves 2—2 joined together by screws passing through lugs 3 at their edges. The inner tube and the metal tube have in them registering openings 4 and 5 respectively to enable connecting lugs 6 on lead spacers 7 to project to the outside of the outer tube where they receive terminals 8. The arrangement enables a full wave rectifier to be assembled in a very compact form, A. C. current being introduced at the outer of the terminals 8 and rectified current being available at the inner of the terminals 8 and a terminal 9 making electrical connection with the tube and with the electrodes at each end. The tubes have additional holes 10 and $10^1$ for cooling purposes.

In Fig. 2 the couples are aligned and secured between two metal end plates 11—11 provided with clamping bolts such as 12 passing between the plates and through the corners thereof. Those parts of the bolts between the plates are surrounded by insulating sleeves such as 13 which centre the couples and leave them free to cool. The arrangement of the couples and terminals is substantially the same as that of Fig. 1, the end plates and the bolts connecting the endmost couples and one of the bolts having a thumb nut 9.

Cooling vanes may be used where necessary.

What I claim is:—

1. An alternating current rectifier comprising an alloy electrode containing aluminium, manganese and magnesium, a paste electrode containing sulphur, selenium, manganese sulphide and antimony sulphide and a layer of a barium compound between said electrodes.

2. An alternating current rectifier comprising an electrode containing a film forming metal, an electrode containing metallic sulphides and a layer of a barium compound between said electrodes.

3. An alternating current rectifier comprising an electrode containing approximately 80% magnesium, ½ to 20% aluminium and 20 to ½% of manganese, a coating of a barium compound on a surface of said electrode and a second electrode in contact with said coating comprising sulphur, selenium, magnesium sulphide and antimony sulphide in substantially the proportions 1:1:1:½ respectively by weight.

4. An alternating current rectifier comprising an alloy electrode containing aluminium, magnesium and manganese, an electrode comprising a metallic sulphide and a layer of barium oxide between said electrodes.

5. An alternating current rectifier comprising an electrode containing a metal having film-forming properties, a second electrode comprising a metallic selenide, and a layer containing a barium compound between said electrodes.

6. A method of making an alternating current rectifier which comprises depositing a film of barium compound on the surface of an alloy of aluminium, magnesium and manganese in an electrolytic bath and applying to said film under pressure a paste containing a metallic sulphide.

7. A method of making an alternating current rectifier comprising forming a barium compound film on the surface of an alloy filming electrode by electrolytic action, applying to such film under pressure a coating containing metallic sulphides and associating with said coating means for making electrical contact therewith.

8. A method of making an alternating current rectifier comprising applying under pressure a sulphide electrode to the surface of an alloy filming electrode on which a film of a barium compound has already been formed, subjecting the composite body so formed to the action of an alternating current, disassociating the contacted surfaces of said electrodes and then replacing said surfaces in close contact with each other.

RONALD JOB ELSOME-JONES.